United States Patent Office 3,063,217
Patented Nov. 13, 1962

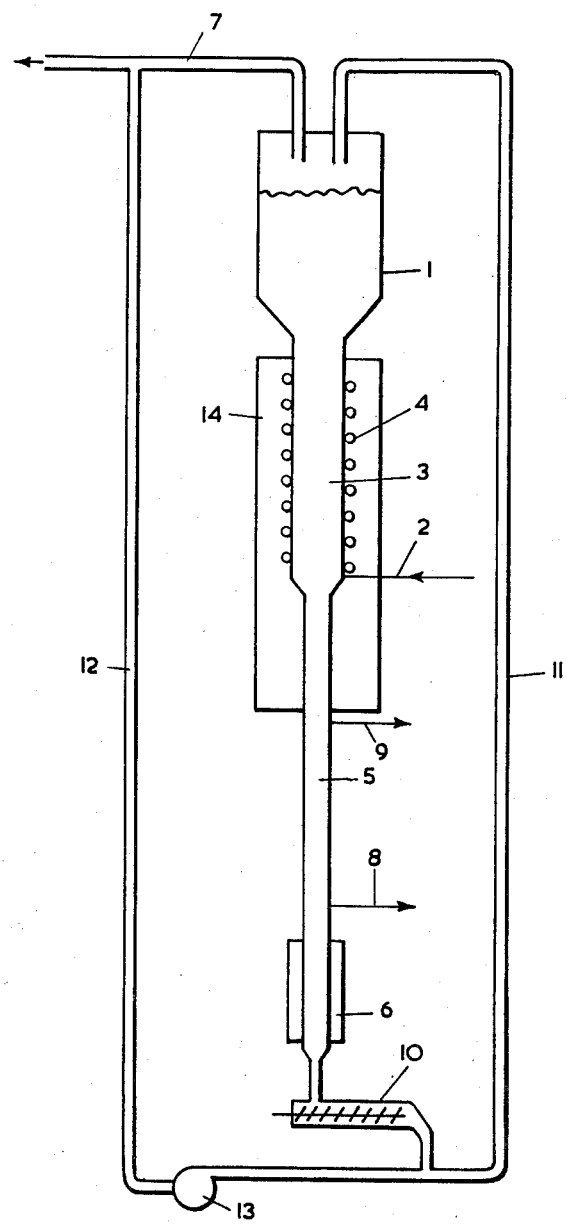

3,063,217
PROCESS FOR THE SEPARATION OF
GAS MIXTURES
John Walter Armond, Worcester Park, and Michael
Carne, London, England, assignors to The British Oxygen Company Limited, a British company
Filed Nov. 18, 1960, Ser. No. 70,200
Claims priority, application Great Britain Nov. 23, 1959
6 Claims. (Cl. 55—60)

This invention relates to the separation of gas mixtures and more particularly to a process for the separation of a fraction rich in krypton and a fraction rich in xenon from a feed gas consisting of oxygen containing small amounts of krypton and xenon.

Krypton and xenon are present in the atmosphere to the extent of 1.14 and 0.086 v.p.m. respectively and it is possible to produce from many low-temperature air separation plants a small oxygen-rich fraction which contains most of the krypton and xenon present in the air entering the plant. The concentration of krypton plus xenon in such a fraction may vary between 0.05% and 0.4% although the latter concentration does not necessarily constitute an upper limit. Higher concentrations are usually avoided owing to the hazard resulting from the simultaneous accumulation of hydrocarbons present in the atmosphere (e.g. methane) with the krypton and xenon. Krypton and xenon are valuable materials and it is in an object of the present invention to provide a method and apparatus by which fractions containing the bulk of the krypton and xenon respectively can be removed from crude oxygen gas produced, for example, by vaporising such a liquid oxygen fraction.

According to one aspect of the present invention, a process for separating a fraction rich in krypton and a fraction rich in xenon from a feed gas consisting of oxygen containing small amounts of krypton and xenon comprises passing the feed gas through an adsorption zone countercurrent to a downwardly moving bed of granular absorbent material at a temperature substantially below 0° C. but above the liquefaction temperature of the feed gas such that krypton and xenon are preferentially adsorbed, subsequently subjecting the adsorbent bed to a gradually increasing temperature in a rectification zone, whereby the adsorbed gases are differentially desorbed, and withdrawing said fractions at appropriate points in the rectification zone. These points will usually be those at which the concentration of krypton and xenon in the desorbed gas are respectively at a maximum. Preferably the adsorption temperature is between about −180° C. and the liquefaction temperature of the feed gas.

According to another aspect of the invention, apparatus for carrying out the process for separating a fraction rich in krypton and a fraction rich in xenon from a feed gas consisting of oxygen containing small amounts of krypton and xenon comprises a column having an upper adsorption zone and a lower fractionation zone, means for continuously passing a bed of granular adsorbent material downwardly through the column, means for cooling the adsorption zone to a temperature substantially below 0° C. but above the condensation temperature of the feed gas such that krypton and xenon will be preferentially adsorbed from the feed gas, means for introducing the feed gas into the adsorption zone, means for heating the bottom of said rectification zone to produce a temperature gradient therein, and means for withdrawing said fractions from appropriate points in the rectification zone.

Suitable adsorbent materials include silica gel, natural zeolites, the synthetic zeolites sold under the names Linde Molecular Sieve Nos. 4A, 5A and 13X, active charcoal, alumina, silica-alumina, doucil and sepiolite. Of these, silica gel is preferred.

The bulk of the oxygen in the feed gas is not adsorbed but leaves the top of the column. The atmosphere usually contains a trace of methane, and, as this accumulates with the krypton and xenon, it will appear in the feed gas. By a suitable choice of adsorbent, this methane can be arranged to leave the top of the column with the bulk of the oxygen. The most effective material for this purpose is again silica gel. In order to prevent the escape of the most strongly adsorbed component, xenon, from the bottom of the column, a slow stream of oxygen, derived from the oxygen leaving the column, may be passed upwardly through the column to act as a purge gas.

One form of apparatus for carrying out the process according to the invention is shown in diagrammatic side section in the accompany drawing.

The apparatus consists of a vertical column 1 down which the granular adsorbent flows at a steady rate. The feed gas is fed into the column 1 through an inlet 2 at the bottom of an adsorption zone 3 located in the upper part of the column and cooled by a suitable refrigerant, for example, liquid oxygen, flowing through coils 4 wound on the outside of the column. The best results are obtained if this zone 3 is cooled to just above the liquefaction temperature of the feed gas since this ensures the highest adsorptive capacity of the adsorbent for krypton and xenon. Below the adsorption zone 3 is a rectification zone 5, the bottom of which is heated by an electrical heater 6, which may be a heating coil wound externally of the column, to a temperature at which little adsorption of xenon occurs. As the adsorbent passes downwardly through the rectification zone 5, its temperature gradually rises and the adsorbed gases are given off. These gases pass back up through the adsorbent and owing to the way in which the gases present distribute themselves between the gas and the adsorbent phases, the most strongly adsorbed gas, xenon, tends to accumulate at a point towards the lower end of the rectification zone 5 and krypton above it; the oxygen escapes upwardly and leaves the column 1 at its top through a pipe 7. Products streams are withdrawn from the rectification zone through outlets 8 and 9 at the points of maximum concentration of xenon and krypton respectively. In order to prevent loss of xenon downwards, a slow oxygen purge is passed upwardly through the column as hereinafter described.

For continuous operation, the adsorbent must be continuously removed from the lower end and returned to the top of the column 1. In the embodiment shown in the drawing this is effected by a screw conveyor 10 at the bottom of the column 1 which removes the adsorbent at a rate controlled by the speed of rotation of the screw. The adsorbent is then returned to the top of the column 1 through a pipe 11 by means of a gas lift, the gas used being exit gas from the top of the column which is withdrawn from the pipe 7 through a branch pipe 12 and circulated by means of a blower 13. The gas pressures in the apparatus are arranged so that a small fraction of the oxygen delivered by the blower passes through the screw conveyor and upwardly through the column 1 to provide the purge gas.

The adsorption zone 3 and the cold end of the rectification zone 5 are protected from heat inleak by surrounding them with thermal insulation 14.

For the process to operate most effectively, the adsorbent must descend the column as a solid plug without channeling, plugging or fluidising and for this the gas flow must be less than a limiting amount for any column diameter and adsorbent mesh size. From a constructional view, the narrowest possible column diameter is advantageous. Since the gas flow and temperature vary in various sections of the column, it is therefore desirable to construct the column 1 as shown in the drawing with different diameters in the different zones. Thus the gas flow in the adsorption zone 3 is approximately equal to the inlet flow of the feed gas into the apparatus and its diameter is chosen accordingly. Above the adsorption zone 3, the gas temperature rises and in view of the increased gas viscosity and greater volume rate of flow due to the decreased density, the column must be wider. In the rectification zone 5, the maximum upward gas flow will not exceed the flow of adsorbed gas downwards, i.e. about one-tenth of the inlet gas rate, so that in this zone, the column can be made correspondingly narrower.

As an alternative to using a gas feed to the adsorption zone, a liquid feed can be used. The liquid is run into the adsorption zone and evaporates there in contact with the adsorbent. This procedure has the advantage of reducing the refrigeration requirements of the apparatus and also overcomes hazards likely to arise from the presence of a trace of acetylene in the feed, which usually occurs in krypton and xenon-rich fractions from an air separation plant. Evaporation of such an acetylene-containing stream may lead to deposition of solid acetylene which can present a hazard. If, however, the evaporation takes place in the presence of a moving adsorbent bed, the acetylene is continuously removed and the hazard eliminated.

In a practical example, using an apparatus as described above, the feed gas was oxygen containing 620 v.p.m. krypton and 46 v.p.m. xenon at a flow rate of 50 l./hr. The adsorbent bed used was silica gel flowing at a rate of 30 cc./hr. and the purge oxygen rate was 0.5 l./hr. The upper product stream withdrawn from the rectification zone at a rate of 0.5 l./hr. contained on the average 60% krypton and 0.6% xenon by volume, and the lower product stream, also withdrawn at 0.5 l./hr., contained 3.3% xenon and 0.1% krypton by volume. This represented 97% krypton and 86% xenon recovery. The temperature of the adsorption zone was a little above $-183°$ C. and that at the bottom of the rectification zone was $100°$ C. The pressure within the apparatus was atmospheric.

We claim:

1. A process for separating a fraction rich in krypton and a fraction rich in xenon from a feed gas consisting of oxygen containing small amounts of krypton and xenon comprising the steps of passing the feed gas through an adsorption zone countercurrent to a downwardly moving bed of granular adsorption material at a temperature substantially below $0°$ C. but above the liquefaction temperature of the feed gas such that krypton and xenon are preferentially adsorbed, subsequently subjecting the adsorbent bed to a gradually increasing temperature in a rectification zone, whereby the adsorbed gases are differentially desorbed, and withdrawing said fractions at appropriate points in said rectification zone.

2. Process according to claim 1 wherein said adsorption step is carried out at a temperature between about $-180°$ C. and the liquefaction temperature of the feed gas.

3. Process according to claim 1 wherein said fraction rich in krypton and said fraction rich in xenon are withdrawn at points in said rectification zone where the concentration of krypton and xenon in the desorbed gas are respectively at a maximum.

4. Process according to claim 1 wherein said adsorbent material is silica gel.

5. Process according to claim 1 wherein a slow stream of a purge gas is passed upwardly through said rectification and adsorption zones counter-current to the adsorbent bed.

6. Process according to claim 4 wherein said purge gas is oxygen.

References Cited in the file of this patent

UNITED STATES PATENTS 2,519,874    Berg ------------------ Aug. 22, 1950